A. C. KERWIN.
LOCK NUT.
APPLICATION FILED OCT. 23, 1919.

1,438,312.  Patented Dec. 12, 1922.

Arthur C. Kerwin
INVENTOR

Patented Dec. 12, 1922.

1,438,312

UNITED STATES PATENT OFFICE.

ARTHUR C. KERWIN, OF NEW YORK, N. Y.

LOCK NUT.

Application filed October 23, 1919. Serial No. 332,739.

*To all whom it may concern:*

Be it known that I, ARTHUR C. KERWIN, citizen of the United States, and resident of New York city, in the county of Bronx and State of New York, have invented certain new and useful Improvements in Lock Nuts, of which the following is a specification.

My invention relates to improvements in lock nuts, by reason of a nut that can be fastened to any degree of tightness. The object of my improvement is to provide a nut and shaft in which the nut is easily put on and easily removed, that will stay on with very little chance of falling off. Also a nut that can be fastened to most any degree of tightness. These lock nuts are intended to be used wherever nuts and shafts are now being used or may be used.

I attain these objects by the mechanism illustrated in the accompanying drawings, in which—

Figure 6:
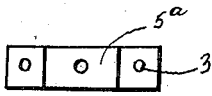
Figure 3:
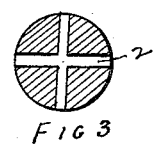
Figure 7:
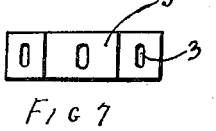
Figure 4:
Figure 1:
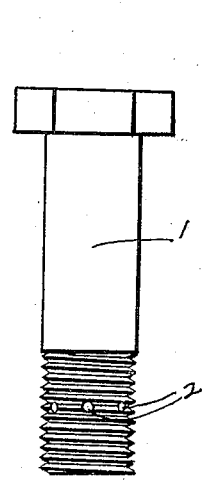
Figure 8:
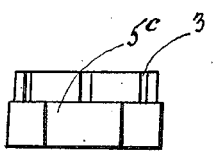
Figure 5:
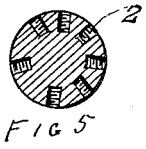
Figure 10:
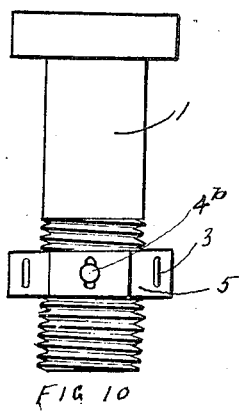
Figure 9:
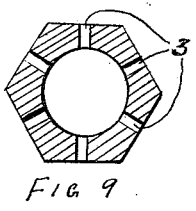
Figure 2:
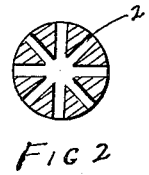
Figure 11:
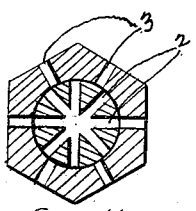
Figures 12, 13:
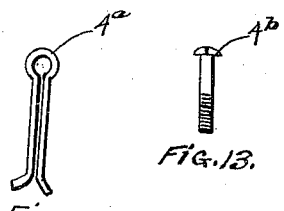

Fig. 1 is a shaft showing the holes running therethrough. Fig. 2 is a section of Fig. 1 showing four holes running through the shaft. Fig. 3 is a section of a shaft showing two holes running through the shaft. Fig. 4 is a section of a shaft showing three holes running through the shaft. Fig. 5 is a section of a shaft showing seven holes running partly through the shaft. Fig. 6 is a hexagonal nut showing holes from the outside face to the inside, at right angles to the axis. Fig. 7 is a hexagonal nut showing slots running from the outside face to the inside face at right angles to the axis. Fig. 8 is a hexagonal castellated nut showing slits from the outside to inside face, at right angles to the axis. Fig. 9 is a section of a hexagonal nut showing the holes running from the outside face to the inside face, at right angles to the axis. Fig. 10 is the shaft with the nut in place fastened by the pin. Fig. 11 is a section of the shaft and nut showing a four-holed shaft and a nut with six openings. Fig. 12 is a pin. Fig. 13 is a screw pin.

1 is a shaft of the sizes and shapes as now in use. 2 are the holes running through the shaft at right angles to the axis. They are spaced so that they will meet the openings in the nut with the least turning of the nut, as in Fig. 11, which shows one hole in alignment with the hole or slot in the nut. By turning the nut to the right or left a fraction of a turn it will be out of alignment with the hole it is now in alignment with, but will be in alignment with the next hole. In the combination of a shaft with four holes with a nut having eight holes, the holes of both are bound to be in alignment by turning the nut or shaft one thirty-second of a turn. In other words, the openings in the nuts and the openings in the shaft are so divided that the number of holes in the shaft times the number of holes in the nut will give you the fraction of the turn of the nut or shaft necessary to have the holes in the nut in alignment with the holes in the shaft. In Figure 4, three holes are shown unequally divided, in order that they will meet the openings in a nut having six holes equally divided without being in alignment with more than one opening at a time. In Figure 3, two holes are shown equally divided in order that they will meet the openings in a nut having six openings equally divided without being in alignment with more than one hole at a time. By having the holes in the shaft running only partly through, you can place more holes at the same distance from the head of the shaft as Fig. 5, showing seven holes running partly through, and are placed according to the number of openings in the nuts in order that an opening in the nut will be in alignment with but one hole in the shaft at a time. In a combination of a nut with six holes with a shaft of seven holes, the hole in the nut will be in alignment with the hole in the shaft every one forty-second turn of the nut or shaft.

I do not limit myself to the number of holes in a row more than one or the number of rows of holes.

3 are the holes or slots or slits in the nut at right angles to the axis. They can be of any number and are so divided that they will meet the holes in the shaft with the least fraction of a revolution of the nut or shaft. I do not limit myself to the number of holes, slits or slots in the nut or the arrangement of same. 4ª is a cotter pin; 4ᵇ is a screw pin. They can be of different kinds, such as cotter pins, wire pins or screw pins. It is proposed to use the screw pins 4ᵇ when the holes run partly through the shaft. 5ª is a nut with holes; 5ᵇ is a nut with slots;

5ᶜ is a castellated nut with slits. Different nuts may be used such as hexagonal or four-sided nuts, with holes, slits or slots.

I claim—

1. In a lock nut the combination with a shaft having a plurality of threaded holes disposed at right angles to its axis, of a nut with openings at right angles to its axis spaced at different degrees relative to the holes so that an opening will align with a hole by the least fraction of a revolution of the nut or shaft, and a screw adapted to engage the aligned opening and hole.

2. In a lock nut the combination with a shaft having a plurality of holes disposed at right angles to its axis, of a nut with openings at right angles to its axis spaced at different degrees relative to the holes so that an opening will align with a hole by the least fraction of a revolution of the nut or shaft, and a device adapted to engage the aligned opening and hole.

3. In a lock nut the combination with a shaft having a plurality of holes extending transversely through the shaft, of a nut with openings at right angles to its axis spaced at different degrees relative to the holes so that an opening will align with a hole by the least fraction of a revolution of the nut or shaft, and a locking device engaging the aligned opening and hole.

Signed at Brooklyn, New York, in the county of Kings and State of New York, this 22nd day of October A. D. 1919.

ARTHUR C. KERWIN.